(12) United States Patent
Ahn et al.

(10) Patent No.: US 8,964,173 B2
(45) Date of Patent: Feb. 24, 2015

(54) MASKLESS EXPOSURE APPARATUS AND SPOT BEAM POSITION MEASUREMENT METHOD USING THE SAME

(75) Inventors: Sung Min Ahn, Suwon-si (KR); Min Seop Park, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 191 days.

(21) Appl. No.: 13/586,371

(22) Filed: Aug. 15, 2012

(65) Prior Publication Data

US 2013/0044315 A1 Feb. 21, 2013

(30) Foreign Application Priority Data

Aug. 19, 2011 (KR) .......................... 10-2011-0083032

(51) Int. Cl.
*G01B 11/26* (2006.01)
*G01B 11/00* (2006.01)

(52) U.S. Cl.
CPC .............. *G01B 11/002* (2013.01); *G01B 11/00* (2013.01)
USPC .............................. 356/138; 356/399; 356/401

(58) Field of Classification Search
CPC .. G03F 7/70791; G03F 9/7011; G03F 9/7088
USPC ................... 356/138, 399–401, 616; 382/151
See application file for complete search history.

(56) References Cited

U.S. PATENT DOCUMENTS

| | | | |
|---|---|---|---|
| 2005/0271421 A1 | 12/2005 | Uemura et al. | |
| 2007/0181825 A1* | 8/2007 | Yoshikawa | 250/491.1 |
| 2008/0088843 A1* | 4/2008 | Shibazaki | 356/399 |
| 2009/0122285 A1* | 5/2009 | Kanaya | 355/53 |
| 2009/0122286 A1* | 5/2009 | Kanaya | 355/53 |
| 2009/0122287 A1* | 5/2009 | Kanaya | 355/53 |
| 2010/0208222 A1 | 8/2010 | Kim et al. | |
| 2011/0013165 A1* | 1/2011 | Kaneko et al. | 355/61 |

FOREIGN PATENT DOCUMENTS

WO  2008-250147  10/2008

OTHER PUBLICATIONS

English Abstract for Publication No. 2008-250147, Publication Date Oct. 16, 2008.

* cited by examiner

*Primary Examiner* — Tarifur Chowdhury
*Assistant Examiner* — Isiaka Akanbi
(74) *Attorney, Agent, or Firm* — F. Chau & Associates, LLC

(57) ABSTRACT

A maskless exposure apparatus which precisely and rapidly measures positions of spot beams of a plurality of optical systems by calculating positions of respective BMSs using a plurality of FMs engraved on an FBA on a movable table. The centers of the respective BMSs are aligned with the centers of random FMs of the plurality of FMs. Thereafter, positions of spot beams irradiated from the plurality of optical systems are quickly and precisely measured using the positions of the respective BMSs and the positions of the FMs measured by the BMSs, thereby more quickly generating mask data to execute maskless exposures.

20 Claims, 10 Drawing Sheets

FIG. 4

| Identifier | X-nominal | Y-nominal | X-error | Y-error |
|---|---|---|---|---|
| 000 | XXX | XXX | 0.xxxx | -0.xxxx |
| 001 | | | | |
| 002 | | | | |
| ... | | | | |
| 008 | | | | |
| 010 | | | | |
| 020 | | | | |
| 030 | | | | |

MASKLESS EXPOSURE APPARATUS AND SPOT BEAM POSITION MEASUREMENT METHOD USING THE SAME

CROSS-REFERENCE TO RELATED APPLICATION

This application claims the benefit of Korean Patent Application No. 2011-0083032, filed on Aug. 19, 2011 in the Korean Intellectual Property Office, the contents of which are herein incorporated by reference in their entirety.

TECHNICAL FIELD

Embodiments of the present disclosure are directed to a maskless exposure apparatus which precisely and rapidly measures positions of spot beams of a plurality of optical systems without use of a mask, and a spot beam position measurement method using the same.

DISCUSSION OF THE RELATED ART

In general, as a method of forming a pattern on a substrate or a semiconductor wafer for forming a liquid crystal display (LCD), a plasma display panel (PDP) or a flat panel display (FPD), a pattern material is applied to a substrate. Portions of the pattern material are selectively exposed using a photo mask, which changes their chemical properties, and the remaining pattern material portions are selectively removed, thereby forming the pattern.

However, to accommodate increased substrate sizes and more precise substrate patterns, a maskless exposure apparatus has been developed which forms a desired pattern on a substrate or a semiconductor wafer without a photo mask. A maskless exposure system enables panel design without increasing manufacturing costs involved with cleaning and storing masks, reduces lead times by omitting the mask manufacturing time, eliminates mask defects and process losses, and increases production flexibility through application of a hybrid layout.

A maskless exposure apparatus forms a pattern by transferring spot beams to a glass substrate using pattern information generated through a control signal using a spatial light modulator (SLM), such as a digital micro-mirror device (DMD).

In such a maskless exposure apparatus, since the spatial light modulator that modulates spot beams according to the pattern is small, an exposing light width covered by one optical system is generally 60~70 mm. Therefore, in the case of a large glass substrate, for example, having a size of more than 2 m, a plurality of optical systems are provided, positions of spot beams irradiated from the plurality of optical systems are measured, mask data is generated using the position information, and patterning is executed using the mask data. Therefore, the positions of the spot beams irradiated from the plurality of optical systems should be precisely measured, and for this purpose, the positions of the spot beams are measured using a beam measurement system.

To measure the positions of the spot beams, the beam measurement system can be mounted on a movable table on which the substrate is placed so that lengthwise and widthwise directions of the beam measurement system coincide with those of the movable table to precisely measure the positions of the spot beams transferred to the substrate.

However, when the beam measurement system is actually mounted on the movable table, the lengthwise and widthwise directions of the beam measurement system may not coincide with the designed lengthwise and widthwise directions of the movable table. Therefore, the position of the beam measurement system actually mounted on the movable table needs to be first detected. In particular, if a plurality of beam measurement systems are mounted on the movable table to measure the positions of the spot beams within a short period of time, positions of the respective beam measurement systems need to be detected to precisely measure positions of spot beams.

SUMMARY

Therefore, an aspect of the present disclosure provides a maskless exposure apparatus which precisely and rapidly measures positions of spot beams of a plurality of optical systems using a plurality of beam measurement systems, and a spot beam position measurement method using the same.

In accordance with one aspect of the present invention, a method of measuring spot beam positions of optical maskless exposure systems includes measuring positions of a plurality of fiducial marks (FMs) engraved on a fiducial beam measurement system (BMS) mark array (FBA) installed on a movable table using a plurality of BMSs installed on the movable table, calculating central position coordinates of the BMSs using position information of the FMs of the FBA and displacements of the FMs measured by the respective BMSs, acquiring image information of spot beams irradiated from the optical systems using the BMSs, and measuring positions of the spot beams using a position of the movable table, positions of the plurality of BMSs and the image information acquired by the BMSs.

The BMSs may be installed at the lower end of the FBA, and the BMSs may have 2 degrees of freedom (X, Y) to be movable in an X-axis direction and a Y-axis direction.

The BMSs' centers may be aligned with the centers of random FMs by adjustments in the X-axis direction and Y-axis direction.

The number of the BMSs may be equal to the number of the optical systems.

The central position coordinates of the BMSs may be calculated by calculating displacements of the FMs from the central position coordinates of the BMSs through the position information of the FMs of the FBA and the image information acquired by the respective BMSs.

Position coordinates of the spot beams irradiated from the optical systems may be determined from position coordinates of the movable table, the central position coordinates of the BMSs and the image information acquired by the respective BMSs.

The spot beam position measurement method may further include forming a pattern on a substrate mounted on the movable table by generating mask data from the measured position information of the spot beams.

Forming the pattern on the substrate may include patterning the mask data on the substrate by acquiring two or more position coordinates of the spot beams.

In accordance with another aspect of the present invention, a maskless exposure apparatus includes a movable table configured to displace a substrate, optical systems configured to project spot beams to form a pattern on the substrate, a fiducial beam measurement system (BMS) mark array (FBA) on which a plurality of fiducial marks (FMs) are engraved and which is installed on the movable table, beam measurement systems (BMSs) to measure the plurality of FMs engraved on the FBA, and a control unit configured to calculate positions of the BMSs using position information between the FMs of the FBA and displacements of the FMs measured by the respective BMSs, to acquire image information of the spot beams using the BMSs, and to measure positions of the spot beams using the positions of the plurality of BMSs and the image information acquired by the BMSs.

The BMSs may be 2-dimensional imaging devices configured to measure position coordinates of the plurality of FMs and the spot beams.

The control unit may calculate the central position coordinates of the BMSs using the position information of the FMs of the FBA and the displacements of the BMs measured by the BMSs.

The control unit may acquire position coordinates of the spot beams irradiated from the optical systems from position coordinates of the movable table, the central position coordinates of the BMSs and the image information acquired by the respective BMSs.

The control unit may form the pattern on the substrate using the mask data by acquiring two or more position coordinates of the spot beams.

In accordance with another aspect of the present invention, there is provided a method of measuring spot beam positions of an optical maskless exposure system, in which the system includes a plurality of beam measurement systems (BMSs) installed on a movable table and a fiducial BMS mark array (FBA) on which a plurality of fiducial marks (FMs) are engraved and which is installed on the movable table. The method includes adjusting positions of the plurality of BMSs to align centers of the plurality of BMSs with centers of the plurality of FMs to determine an installation error angle and a assembly error angle of the FBA, calculating central position coordinates of the BMSs due to the installation errors of the respective BMSs and the assembly error of the FBA using position information of the FMs of the FBA and displacements of the FMs measured by the respective BMSs, using the plurality of BMSs to acquire positions of a plurality of spot beams irradiated from a plurality of optical systems onto a substrate disposed on said movable table, and determining positions of the spot beams relative to a fixed stage underlying the movable table using a position of the moving table, positions of the plurality of BMSs and the image information of the displacement of each beam acquired by the BMSs.

The central position coordinates of the BMSs may be calculated from $$^{M}q_k = R(\alpha) \cdot (^{F}p_k - ^{F}p_F) - R(\beta_k) \cdot {}^{BMSk}d_k,$$

where $^{M}q_k$ are central position coordinates of the respective BMSs with respect to the movable table, $^{F}p_k$ is an position vector of the $k^{th}$ BMS on the movable table relative to an FM with respect to the FBA, $^{F}p_F$ is the position vector of a random FM on the movable table with respect to the FBA, $\alpha$ is the assembly error angle of the FBA mounted on the movable table with respect to the stage, $\beta_k$ is the installation error angle of the $k^{th}$ BMS with respect to the stage, R is a rotation matrix, and $^{BMSK}d_k$ is a displacement of the FM on the FBA from the center of the $k^{th}$ BMS as measured by the $k^{th}$ BMS.

The positions of the spot beams with respect to the stage may be calculated from $$^{S}r_i = {}^{S}r_M + R(\alpha) \cdot (^{F}p_k - ^{F}p_F) - R(\beta_k) \cdot {}^{BMSk}d_k + R(\beta_k) \cdot {}^{BMSk}d_i,$$

where $^{S}r_i$ is a position of the $i^{th}$ spot beam measured by a BMS with respect to the stage, $^{S}r_M$ is a position of the movable table acquired through a feedback signal from the stage, $R(\alpha) \cdot (^{F}p_k - ^{F}p_F) - R(\beta_k) \cdot {}^{BMSk}d_k$ is the central position coordinates of the $k^{th}$ BMS with respect to the movable table, and $R(\beta_k) \cdot {}^{BMSk}d_i$ is a displacement $^{BMSk}d_i$ of the $i^{th}$ spot beam measured by the $k^{th}$ respective BMS as corrected for the installation error angle $\beta_k$ of the $k^{th}$ BMS.

BRIEF DESCRIPTION OF THE DRAWINGS

FIG. 4 is a table of corrections of manufacturing errors relative to nominal positions of an FBA in a maskless exposure apparatus in accordance with an embodiment of the present disclosure.

DETAILED DESCRIPTION OF EXEMPLARY EMBODIMENTS

Figure 1:
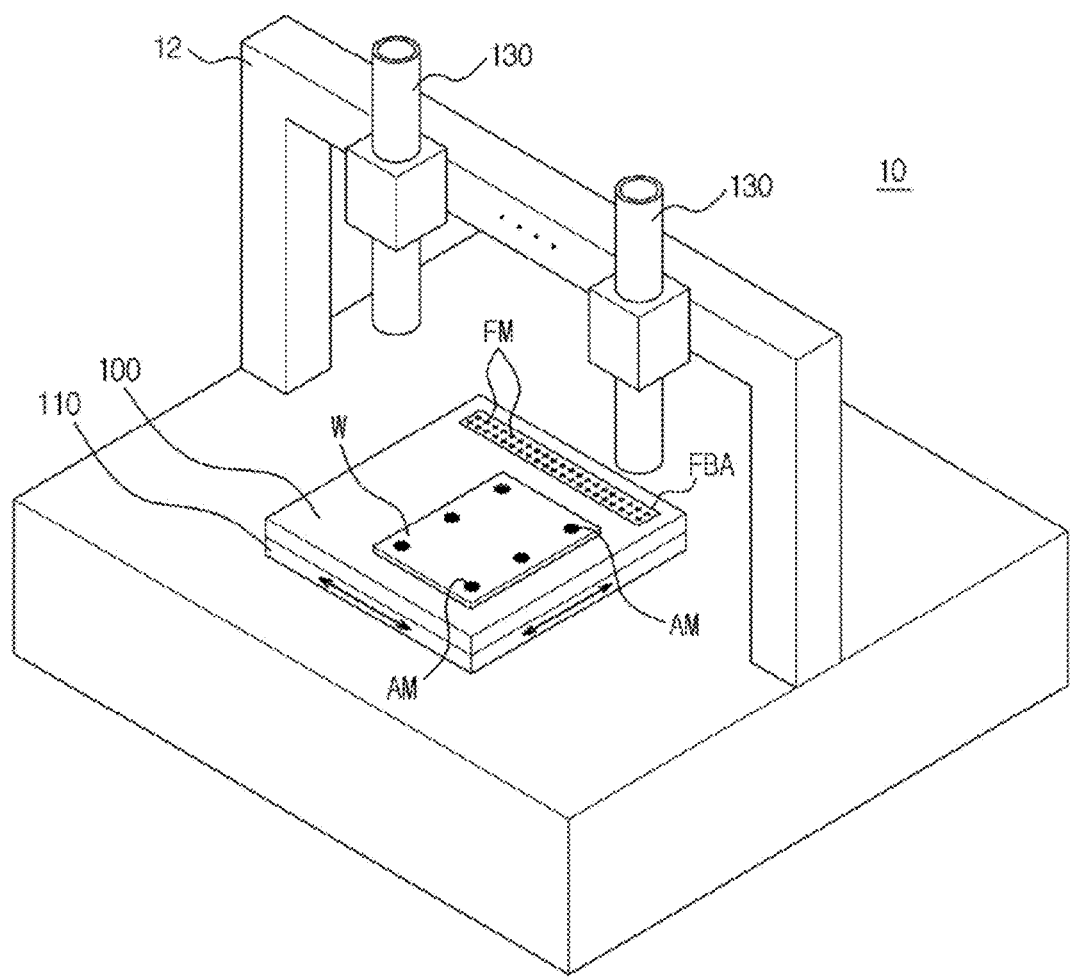
FIG. 1 illustrates an overall configuration of a maskless exposure apparatus in accordance with one embodiment of the present disclosure.

Reference will now be made in detail to exemplary embodiments of the present disclosure, examples of which are illustrated in the accompanying drawings, wherein like reference numerals refer to like elements throughout.

Figure 2:
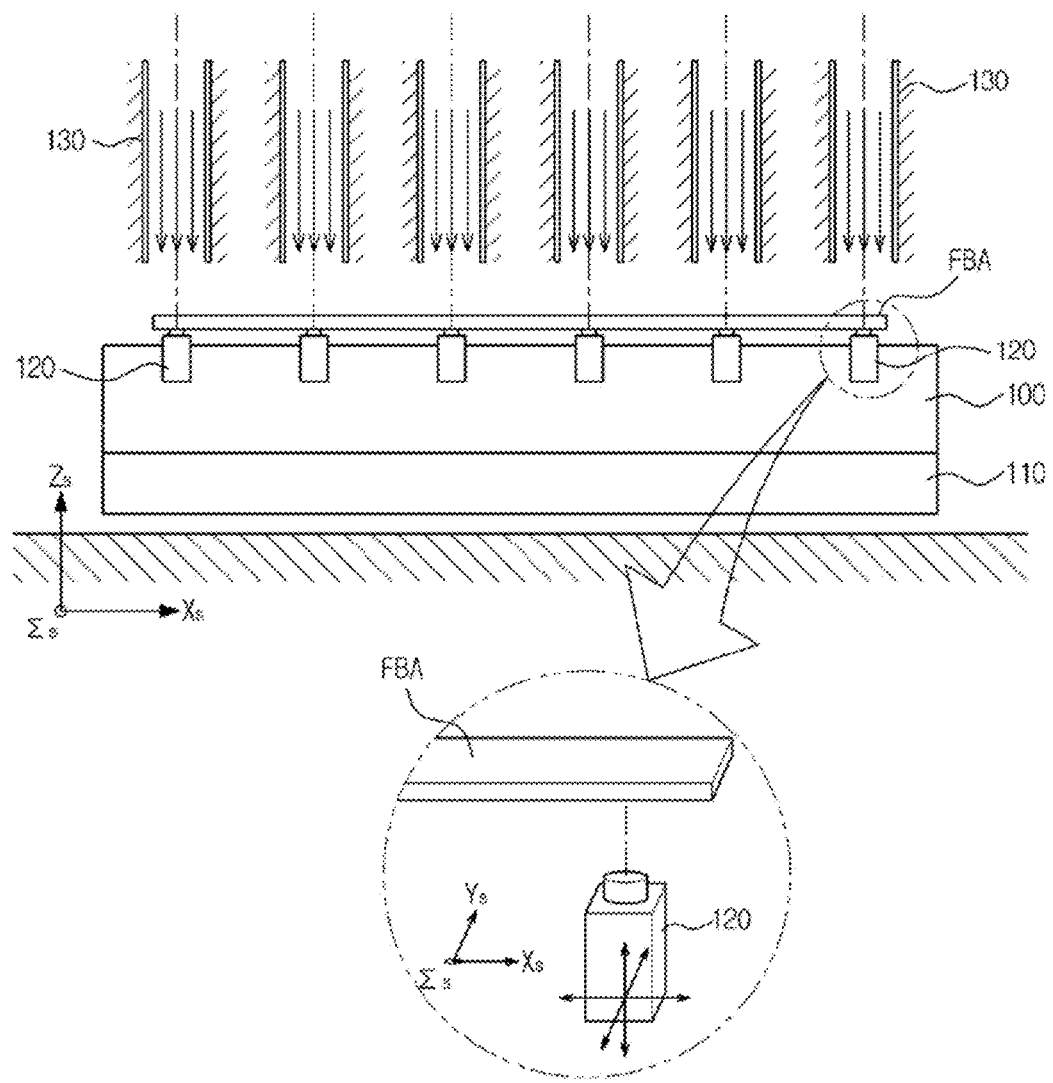
FIG. 2 illustrates a portion of the maskless exposure apparatus in accordance with an embodiment of the present disclosure.

FIG. 1 illustrates an overall configuration of a maskless exposure apparatus in accordance with one embodiment of the present disclosure, and FIG. 2 illustrates a portion of a maskless exposure apparatus in accordance with an embodiment of the present disclosure.

As shown in FIGS. 1 and 2, a maskless exposure apparatus 1 in accordance with an embodiment of the present disclosure includes a movable table 100 on which a substrate W is mounted, and optical systems 130 located above the movable table 100 to irradiate spot beams onto the substrate W mounted on the movable table 100. The substrate W can be any sample upon which a designated pattern is to be formed, such as a semiconductor wafer or a glass substrate. The substrate W includes alignment marks (AMs) engraved thereon. The optical systems 130 are fixed to a gantry 12 and irradiate spot beams onto the substrate W to form mask data in a desired pattern shape. One or more optical systems 130 may be provided.

Further, a beam measurement system (BMS) 120 to measure spot beam positions, and a fiducial BMS mark array (FBA) having an array of a plurality of fiducial marks (FMs) engraved thereon, are mounted on the movable table 100. The FBA will be described later with reference to FIG. 3.

One or more BMSs 120 may be provided corresponding to one or more optical systems 130. One or more BMSs 120 may be located at the lower end of the FBA.

The movable table 100 on which the substrate W is mounted has 2 degrees of freedom ($X_S$, $Y_S$) as indicated by coordinate system $\Sigma_S$ in FIG. 2, to be movable in the X-axis direction and the Y-axis direction according to operation of a fixed XY stage (hereinafter, referred to as a stage) 110. A third direction $Z_S$ parallel to the projection direction of the spot beams and perpendicular to the plane of the table surface is also indicated in FIG. 2.

Figure 3:
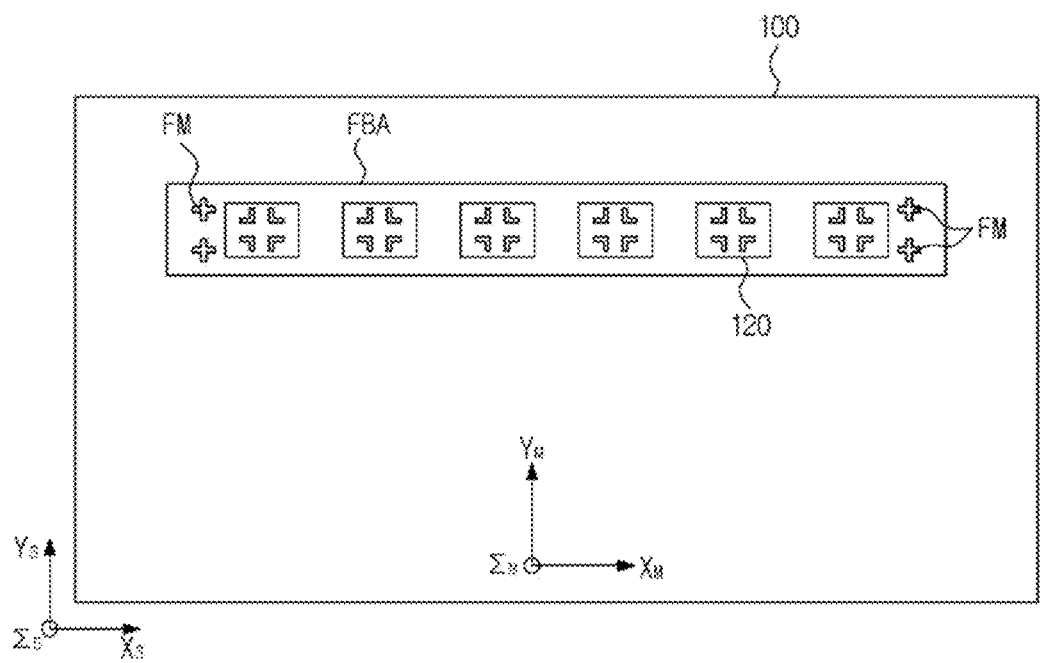
FIG. 3 illustrates a movable table on which a fiducial BMS mark array (FBA) is mounted in a maskless exposure apparatus in accordance with an embodiment of the present disclosure.

FIG. 3 illustrates a movable table on which an FBA is mounted in a maskless exposure apparatus in accordance with an embodiment of the present disclosure, and FIG. 4 is a table illustrating correction of manufacturing errors relative to nominal positions of an FBA in a maskless exposure apparatus in accordance with an embodiment of the present disclosure.

The BMSs 120 have 2 degrees of freedom ($X_M$, $Y_M$) as indicated by coordinate system $\Sigma_M$ in FIG. 3, to be movable in the X-axis direction and the Y-axis direction.

As shown in FIG. 3, an FBA includes a plurality of FMs to measure the positions of the BMSs 120 to acquire position coordinates, in particular, central coordinates, of the respective BMSs 120, and the plurality of FMs are arranged in an array and mounted on the movable table 100.

The plurality of FMs are engraved on the FBA in a 2-dimensional array having M(rows)×n(columns) with a predetermined interval. The plurality of FMs are used to acquire position coordinates of the respective BMSs 120. Manufacturing errors relative to nominal positions are measured for each of the FMs engraved on the FBA. The manufacturing errors may be corrected using correction table containing correction information for each identified BMS, as shown in FIG. 4.

Figure 5:
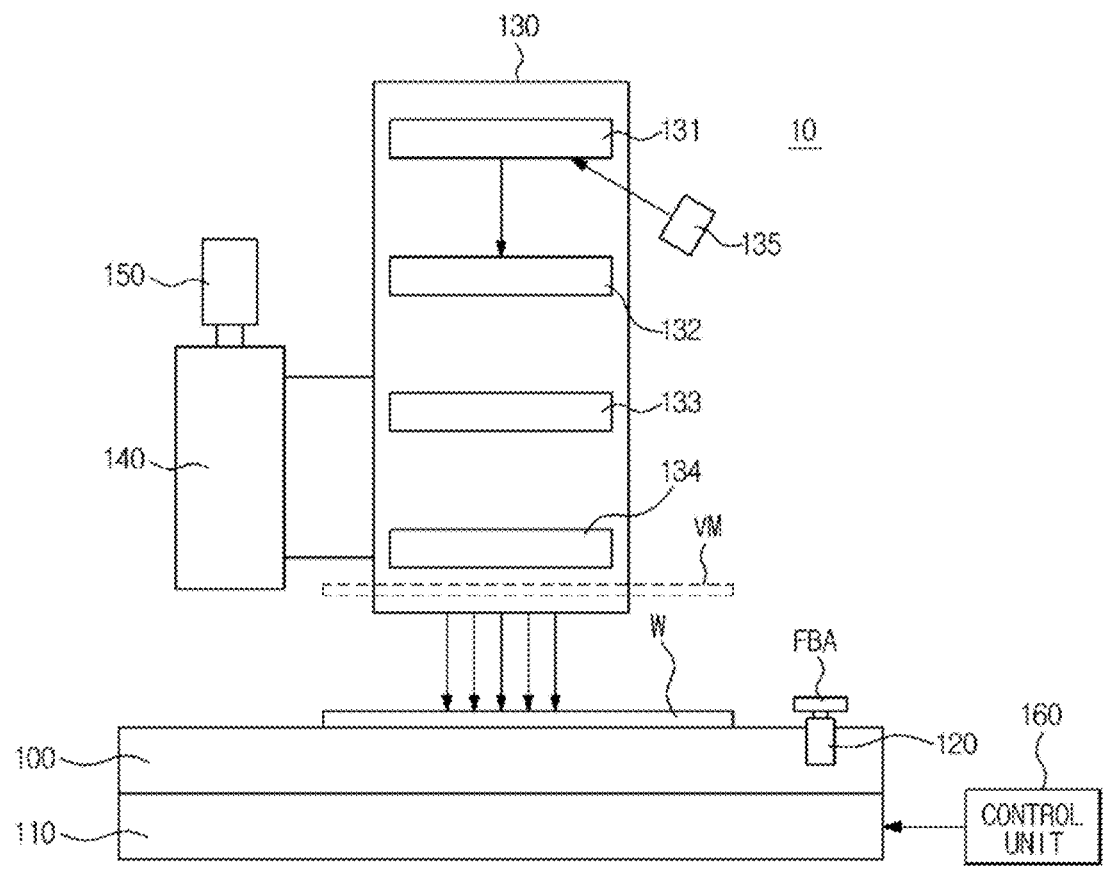
FIG. 5 illustrates a maskless exposure apparatus in accordance with an embodiment of the present disclosure.

FIG. 5 illustrates a maskless exposure apparatus in accordance with an embodiment of the present disclosure.

As shown in FIG. 5, a maskless exposure apparatus 1 in accordance with an embodiment of the present disclosure includes the stage 110, the BMSs 120, the optical systems 130, an alignment system 140, a mark photographing unit 150, and a control unit 160.

The stage 110 serves to displace the movable table 100 on which the substrate W to be exposed is mounted in the X-axis direction and the Y-axis direction. The stage 110 displaces the movable table 100 according to instructions from the control unit 160 so that spot beams irradiated onto the movable FMs are located within the fields of view (FOVs) of the BMSs 120.

The BMSs 120 are 2-dimensional image devices mounted in the lower portion of the movable table 100 and can be displaced in the X-axis direction and the Y-axis direction according to the operation of the stage 110 to measure the positions of the movable FMs and the spot beams.

These BMSs 120 have 2 degrees of freedom ($X_M$, $Y_M$) and thus may be finely adjusted, and the centers of the BMSs 120 may be aligned with the centers of the FMs engraved on the FBA through adjustment in the X-axis direction and the Y-axis direction. Further, the BMSs 120 have an auto focus function in an optical-axis direction (the Z-axis direction).

The optical systems 130 are fixed to one side of the stage 110 and expose the substrate W using the plurality of spot beams of pattern forming light to form a pattern of a virtual mask (VM). Each of the optical systems 130 includes a light source 135 outputting laser light for exposure, a light modulation element 131 to modulate the light from the light source 135 into light having the pattern of the VM, a first projection lens 132 to magnify the light modulated by the light modulation element 131, a multi lens array (MLA) 133 having a plurality of lenses to separate the light magnified by the first projection lens 132 into a plurality of spot beams and to collimate the spot beams, and a second projection lens 134 to adjust the resolution of the spot beams collimated by the MLA 133 and to transmit the adjusted spot beams.

The light modulation element 131 includes a spatial light modulator (SLM). For example, as the light modulation element 131, a micro electro mechanical system (MEMS) type digital micro-mirror device (DMD), a two-dimensional grating light valve (GLV), an electro-optical element using transparent ceramic, i.e., lead zirconate titanate (PLZT), or ferroelectric liquid crystal (FLC) may be used. Hereinafter, for convenience of illustration, an optical modulation element 131 using a DMD will be described.

A DMD includes a memory cell and a plurality of micro mirrors arranged in a matrix of L (columns)×M (rows) on the memory cell. The DMD varies angles of the respective micro mirrors based on a control signal generated according to image data, reflects desired beams of light to the first projection lens 132, and transmits other beams of light at different angles to block the beams of light.

When a digital signal is recorded in the memory cell of the light modulation element 131 including a DMD, the micro mirrors are tilted in the range of designated angles (for example, ±2°) with respect to a diagonal line. The micro mirrors are respectively controlled to be on or off by the control unit 160, which will be described below. Light reflected by the micro mirrors in the on state exposes a target object, such as a photoresist PR, to be exposed on the substrate W, and light reflected by the micro mirrors in the off state does not expose the target object to be exposed on the substrate W.

The first projection lens 132 includes a double telecentric optical system, magnifies an image having passed through the optical modulation element 31 by, for example, about 4 times, and projects the magnified image onto the aperture plane of the MLA 133.

The second projection lens 134 also includes a double telecentric optical system, and magnifies the plurality of spot beams collimated by the MLA 133 by, for example, about 1 time, and projects the magnified spot beams onto the substrate W. Although an embodiment of the present invention illustrates the first projection lens 132 and the second projection lens 134 as respectively having 4× and 1× magnifications, magnifications of the first and second projection lenses 132 and 134 are not limited thereto, and an optimal combination of magnifications may be determined according to a desired spot beam size and a minimum feature size of a pattern to be exposed.

The MLA 133 is a 2-dimensional arrangement of the plurality of lenses corresponding to the micro mirrors of the light modulation element 131. For example, if the light modulation element 131 includes 1920×400 micro mirrors, 1920×400 micro lenses are arranged in the MLA 133. Further, an arrangement pitch of the micro lenses may be substantially equal to a value obtained by multiplying an arrangement pitch of the micro mirrors of the light modulation element 131 by the magnification of the first projection lens 132.

The light source 135 includes a semiconductor laser or an ultraviolet lamp. Laser light is output from the light source 135 toward the light modulation element 131 to be projected onto the substrate W mounted on the movable table of the optical system 130.

Further, the optical system 130 generates a VM having a pattern formed by the plurality of spot beams projected by the second projection lens 134.

The VM is not a physical mask, and is formed by a pattern of the plurality of spot beams turned on/off by the light modulation element 131 that corresponds to a pattern stored in advance. A pattern size of the VM to be formed on the substrate W is determined by scanning the stage 110 in a main scanning direction (in the Y-axis direction) and stepping the stage 110 in a sub-scanning direction (in the X-axis direction).

In the above-described maskless exposure apparatus 10, the light source 135 outputs light, and the light modulation element 131 modulates the light output from the light source 135 into light having the VM pattern. Then, the first projection lens 132 magnifies the light having the VM pattern, the MLA 133 separates the magnified light having the VM pattern of the VM into the plurality of spot beams and collimates the plurality of spot beams, and the second projection lens 134 adjusts the resolution of the collimated spot beams and projects the spot beams, thereby executing an exposure.

The alignment system 140 is provided above the stage 110, and is an alignment scope unit (ASU) of an off-axis type which measures positions of the alignment marks (AMs) engraved on the substrate W.

The mark photographing unit 150 is provided above the alignment system 140, photographs the AMs engraved on the substrate W, and transmits a photographed image to the control unit 160. Here, until the AMs are photographed by the mark photographing unit 159, movement of the stage 110 is controlled according to instructions from the control unit 160.

The control unit 160 acquires position coordinates of the respective BMSs 120 using the plurality of FMs engraved on the movable FBA. Here, the control unit 160 acquires the position coordinates of the respective BMSs 120 by aligning the centers of the BMSs 120 with the centers of the FMs of the FBA by adjusting the respective BMSs 120 in the X-axis direction and the Y-axis direction. The control unit 160 measures the positions of the spot beams irradiated from the respective optical systems 130 through the respective BMSs 120 by displacing the movable table 100 to align the spot beams irradiated onto the FMs engraved on the FBA within FOVs of the BMSs 120.

Therefore, the control unit 160 generates mask data according to the position coordinates of the respective BMSs 120 and the positions of the spot beams measured by the respective BMSs 120, and thus forms a pattern on the substrate W.

Hereinafter, a method of measuring the positions of the spot beams irradiated from the respective optical systems 130 in the maskless exposure apparatus 10 including the plurality of BMSs 120 and the plurality of optical systems 130 will be described.

Prior to measuring the positions of the spot beams irradiated from the respective optical systems 130, position errors of the FMs due to installation of the respective BMSs 120 and positions of the respective BMSs 120 need to be acquired.

First, a method of measuring the position errors of the FMs due to installation of the respective BMSs 120 will be described with reference to FIGS. 6 and 7.

Figure 6:
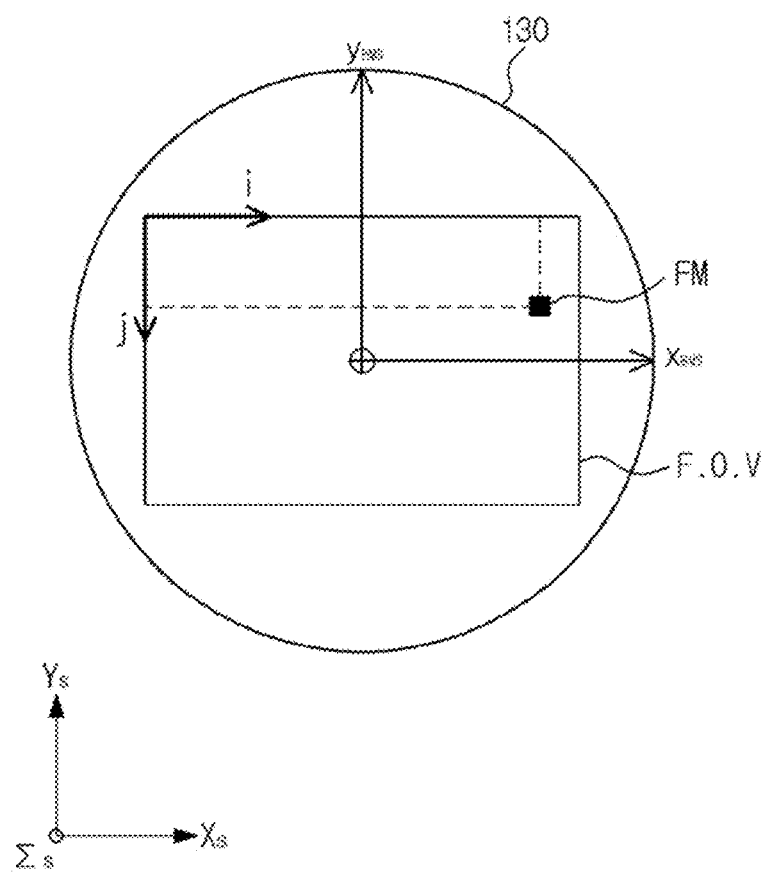
FIG. 6 illustrates one mark position measured by a $k^{th}$ beam measurement system of a plurality of beam measurement systems installed on a maskless exposure apparatus in accordance with an embodiment of the present disclosure.
Figure 7:
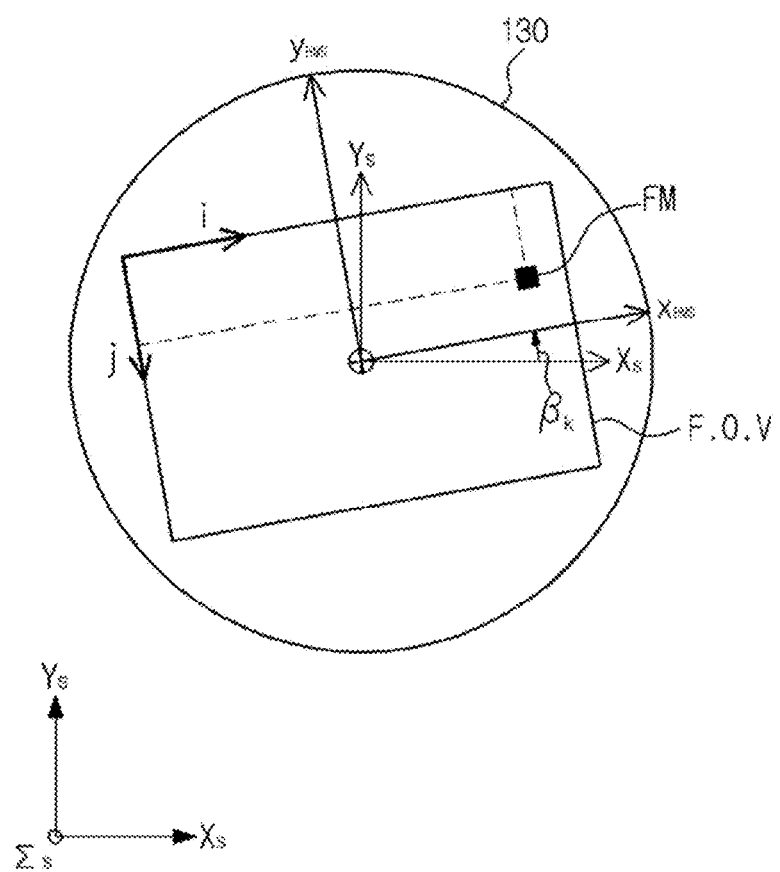
FIG. 7 illustrates another mark position measured by the $k^{th}$ beam measurement system of the plurality of beam measurement systems installed on the maskless exposure apparatus in accordance with an embodiment of the present disclosure

FIG. 6 illustrates one mark position measured by a $k^{th}$ BMS of the plurality of BMSs installed on a maskless exposure apparatus in accordance with an embodiment of the present disclosure, and FIG. 7 illustrates another mark position measured by the $k^{th}$ BMS of the plurality of BMSs installed on a maskless exposure apparatus in accordance with an embodiment of the present invention.

As shown in FIGS. 6 and 7, the $k^{th}$ BMS 120 measures physical quantities of an FM engraved on the FBA on the movable table through the FOV of the $k^{th}$ BMS 120, defined as follows.

$\Sigma_S(X_S, Y_S)$ is a body fixed coordinate system of the stage 110, hereinafter referred to as a stage coordinate system.

$\Sigma_{BMS}(\Sigma_V)$ is a body fixed coordinate system of the $k^{th}$ BMS 120, hereinafter referred to as an image coordinate system.

Here, k is 0, 1, 2, . . . .

FIG. 6 illustrates an ideal installation of the $k^{th}$ BMS 120. In this case, the orientation of the $k^{th}$ BMS 120 with respect to respective directions (i, j) is aligned with that of the stage coordinate system $\Sigma_S$, i.e., the installation error $\beta_k$ of the $k^{th}$ BMS 120 is 0.

FIG. 7 illustrates a general installation of the $k^{th}$ BMS 120. In this case, the orientation of the $k^{th}$ BMS 120 with respect to the respective directions (i, j) are not aligned with that of the stage coordinate system $\Sigma_S$. Thus, there is an installation error angle $\beta_k$ of the $k^{th}$ BMS 120 resulting from the assembly.

In general, due to installation errors, the orientation of the BMSs 120 with respect to the respective directions (i, j) are not aligned with the stage coordinate system $\Sigma_S$, as shown in FIG. 6, but are rotated from the stage coordinate system $\Sigma_S$ by installation error angles $\beta_k$, as shown in FIG. 7.

Due to these installation errors, the respective BMSs 120 do not precisely measure the positions of the spot beams irradiated from the respective optical systems 130 onto the substrate W, position coordinates of the plurality of BMSs 120 due to the respective installation error angles $\beta_k$ need to be acquired. This will be described with reference to FIGS. 8 and 9.

Figure 8:
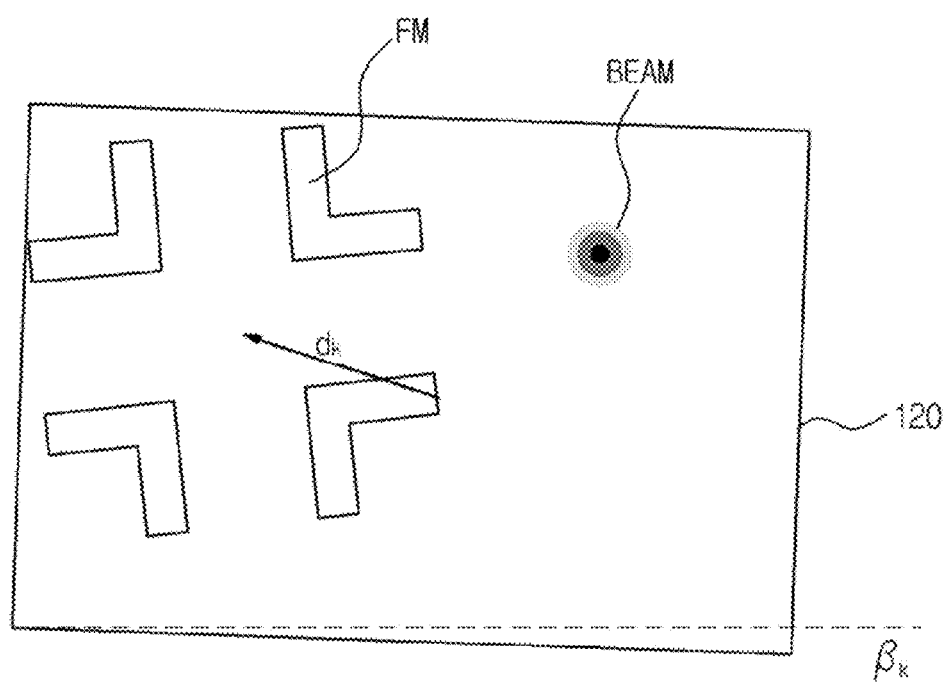
FIG. 8 illustrates a rotated beam measurement system a maskless exposure apparatus in accordance with an embodiment of the present disclosure.

FIG. 8 illustrates a rotated BMS in a maskless exposure apparatus in accordance with an embodiment of the present disclosure.

In FIG. 8, the BMS 120 is adjusted in the X-axis direction and the Y-axis direction to align the center of the BMS 120 with the center of the FM engraved on the FBA. Note that FIG. 8 exaggerates the adjustment of the BMS 120 for convenience of illustration. In this case, the BMS 120 has an installation error angle $\beta_k$ and a misalignment error $d_k$ with respect to the movable table 100.

Figure 9:
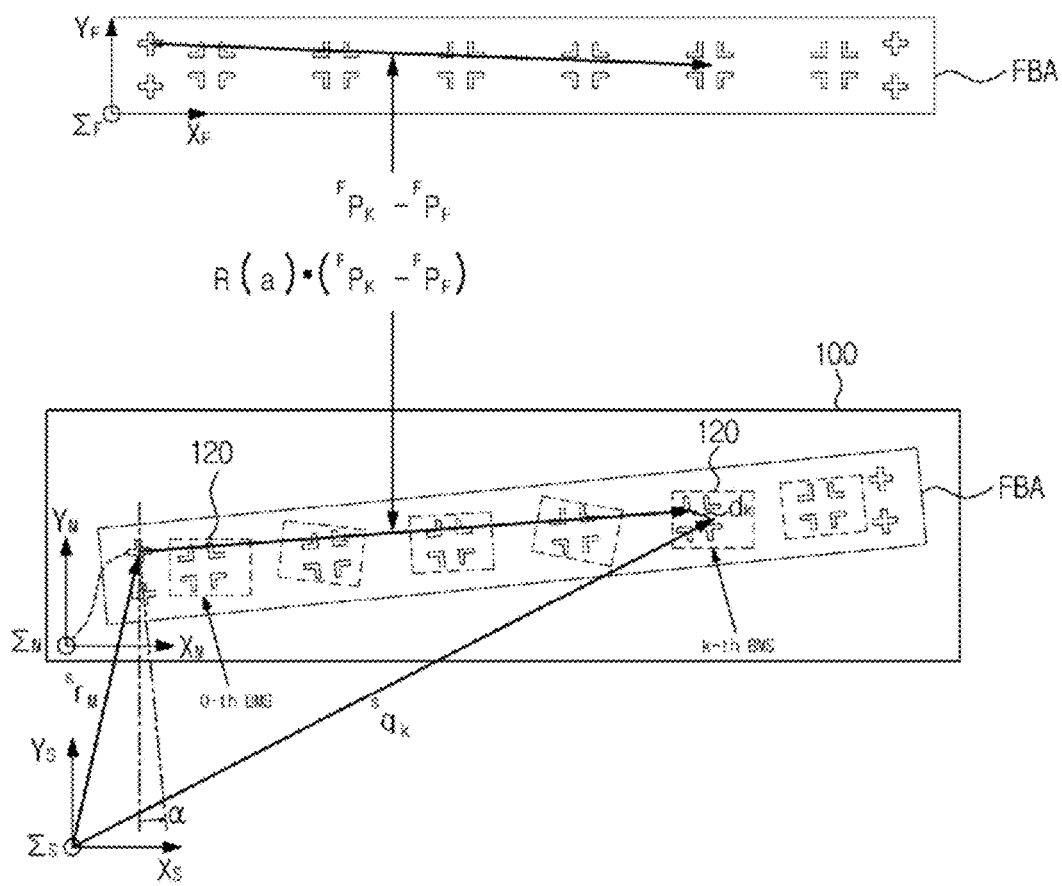
FIG. 9 illustrates a process of acquiring position coordinates of a beam measurement systems using an FBA provided with a plurality of fiducial marks in a maskless exposure apparatus in accordance with an embodiment of the present disclosure.

FIG. 9 illustrates a process of acquiring position coordinates of the BMSs using the FBA provided with plurality of FMs in a maskless exposure apparatus in accordance with an embodiment of the present disclosure.

FIG. 9 depicts six BMSs 120 having installation error angles $\beta_k$. Note that the number of BMSs depicted in FIG. 9 is exemplary and non-limiting, and was chosen for convenience of illustration.

In FIG. 9, rectangles formed by dashed lines in the FBA on the movable table 100 represent the FOVs of the respective BMSs 120. The plurality of BMSs 120 are used to simultaneously acquire positions of the spot beams irradiated from the plurality of optical systems 130, and the time required to acquire positions of the spot beams is inversely proportional to the number of the BMSs 120.

As described above, the central position coordinates of the respective BMS 120 are defined using the plurality of FMs, as follows.

$\Sigma_F(X_F, Y_F)$ is a body fixed coordinate system of the FBA, hereinafter, referred to as an array coordinate system.

$\Sigma_M(X_M, Y_M)$ is a body fixed coordinate system of the movable table 100, hereinafter referred to as a movable coordinate system. The origin of the movable coordinate system $\Sigma_M$ may be a random point on the movable table 100, or an FM located at the upper end of the left side of the FBA.

$\Sigma_O(X_O, Y_O)$ is a reference coordinate system to acquire the position and orientation of a target object W mounted on the movable table 100, and is provided on the movable table 100.

Here, the central position coordinates of the respective BMSs 120 with respect to the movable coordinate system $\Sigma_M$ are referred to as $^M q_k$, and the central position coordinates of the respective BMSs 120 with respect to the stage coordinate system $\Sigma_S$ are referred to as $^S q_k$.

$^M q_k$ and $^S q_k$ are the central position coordinates of the $k^{th}$ BMS 120, and are defined by Equation 1 and Equation 2 below by calculating a displacement of the FM from the central position coordinates of the $k^{th}$ BMS 120 through position information of the FMs of the FBA and image information acquired by the respective BMSs 120.

$$^M q_k = R(\alpha) \cdot (^F p_k - ^F p_F) - R(\beta_k) \cdot ^{BMSk} d_k \quad \text{[Equation 1]}$$

$$^S q_k = ^S r_M + ^M q_k \quad \text{[Equation 2]}$$

In Equation 1 and Equation 2, $^F p_k$ is the FM position vector of the $k^{th}$ BMS 120 on the movable table 100 with respect to the array coordinate system $\Sigma_F$, corrected for manufacturing errors from the correction table of FIG. 4, and $^F p_F$ is the position vector of a random FM on the movable table 100, i.e., in this embodiment, the position vector of the FM located at the upper end of the left side of the FBA, with respect to the array coordinate system $\Sigma_F$, corrected for manufacturing errors from the correction table of FIG. 4.

Further, $\alpha$ is an assembly error angle of the FBA mounted on the movable table 100 with respect to the stage coordinate system $\Sigma_S$, $\beta_k$ is an assembly error angle of the $k^{th}$ BMS 120 with respect to the stage coordinate system $\Sigma_S$, R is a rotation matrix, $^{BMSK} d_k$ is the displacement of the FM on the FBA from the center of the $k^{th}$ BMS 120, as measured by the $k^{th}$ BMS 120, and $^S r_M$ is the position of the movable table with respect to the stage coordinate system $\Sigma_S$.

Once the central position coordinates of the respective BMSs 120 due to the installation errors $\beta_k$ of the respective BMSs 120 and the assembly error a of the FBA are determined, as described above, the positions of spot beams irradiated from the plurality of optical systems 130 may be determined using the respective BMSs 120. This will be described with reference to FIG. 10.

Figure 10:
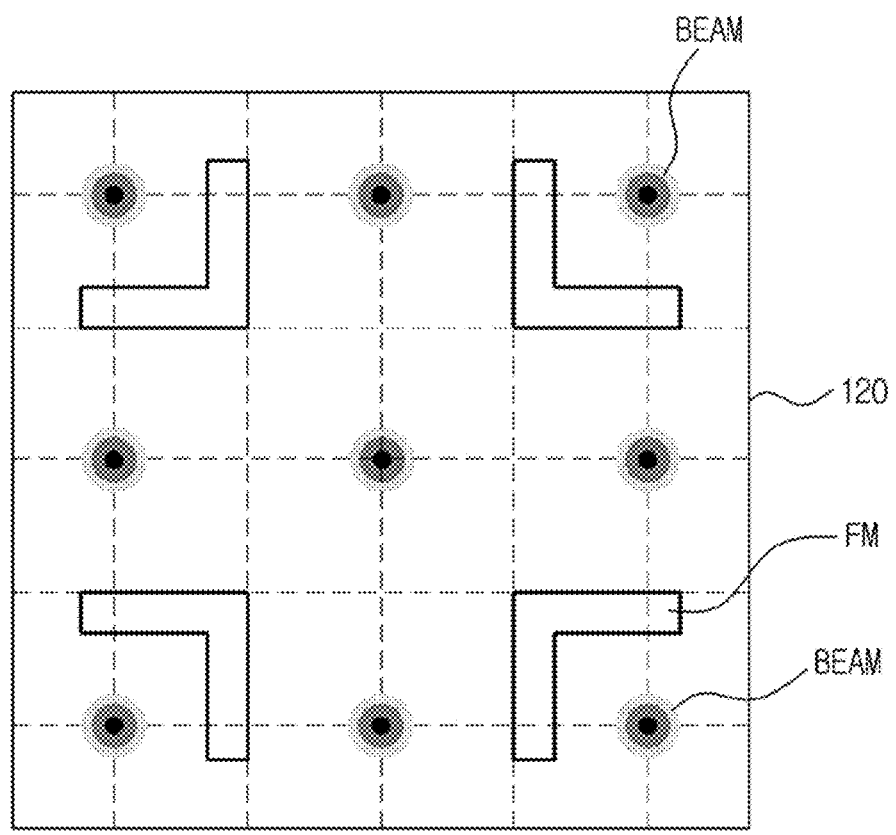
FIG. 10 illustrates a process of calculating positions of spot beams irradiated from a plurality of optical systems using a plurality of beam measurement system in a maskless exposure apparatus in accordance with an embodiment of the present disclosure.

FIG. 10 illustrates a process of calculating positions of spot beams irradiated from the plurality of optical systems using the plurality of BMSs in a maskless exposure apparatus in accordance with an embodiment of the present disclosure.

In FIG. 10, spot beams positions $^S r_i$ measured by the respective BMSs 120 with respect to the stage coordinate system $\Sigma_S$ are defined by Equation 3 below.

$$^S r_i = ^S q_k + R(\beta_k) \cdot ^{BMSk} d_i = (^S r_M + ^M q_k) + R(\beta_k) \cdot ^{BMSk} d_i \quad \text{[Equation 3]}$$

When the central position coordinates $^M q_k$ of the respective BMSs 120 with respect to the movable coordinate system acquired by Equation 1 above are substituted into Equation 3, the positions of the spot beams with respect to the stage coordinate system $\Sigma_S$ may be determined from Equation 4 below.

$$^S r_i = ^S r_M + R(\alpha) \cdot (^F p_k - ^F p_F) - R(\beta_k) \cdot ^{BMSk} d_k + R(\beta_k) \cdot ^{BMSk} d_i \quad \text{[Equation 4]}$$

In Equation 4, $^S r_i$ is the position of the $i^{th}$ spot beam measured by each of the respective BMSs 120 with respect to the stage coordinate system $\Sigma_S$, $^S r_M$ is the position of the movable table 100 acquired through a feedback signal of the stage 110, $R(\alpha) \cdot (^F p_k - ^F p_F) - R(\beta_k) \cdot ^{BMSk} d_k$ is the central position coordinates of the $k^{th}$ BMS 120 with respect to the movable coordinate system $\Sigma_M$, and $R(\beta_k) \cdot ^{BMSk} d_i$ is the displacement $^{MMSk} d_i$ of the $i^{th}$ spot beam measured by the $k^{th}$ respective BMS 120 as corrected for the installation errors $\beta_k$ of the $k^{th}$ BMS.

As stated in Equation 4, the positions $^S r_i$ of the $i^{th}$ spot beams irradiated from the plurality of optical systems 130 onto the substrate W are determined from the position $^S r_M$ of the movable table 100, the positions $^M q_k$ of the respective BMSs 120 and the image information $^{BMSk} d_i$ acquired by the respective BMSs 120.

When two spot beam positions $^S r_i$ on the substrate W are determined, the positions of the other spot beams with respect to the stage coordinate system $\Sigma_S$ may be calculated. On the other hand, when more than two spot beam positions $^S r_i$ on the substrate W are determined, the positions of the other spot beams with respect to the stage coordinate system $\Sigma_S$ may be calculated using the least squares method.

Although exemplary embodiments of the present disclosure illustrate the positions of $^S r_i$ of an $i^{th}$ spot beam irradiated from the plurality of optical systems 130 as being acquired using the $k^{th}$ BMS 120 of the plurality of BMSs 120, the positions of $^S r_i$ of the plurality of spot beams may be respectively measured using the plurality of BMSs 120. In this case, the positions $^M q_k$ of the plurality of BMSs 120 need to be predetermined, and the image information $^S d$ acquired by the respective BMSs 120 is used enable parallel processing. If, on the other hand, the respective BMSs may sequentially and rapidly process the image information, quasi-parallel processing may be enabled. When the plurality of BMSs 120 are used, the positions of $^S r_i$ of the spot beams irradiated from the plurality of optical systems 130 may be more rapidly acquired, and thus the positions of the spot beams with respect to the stage coordinate system $\Sigma_S$ may be more quickly measured.

As is apparent from the above description, a maskless exposure apparatus and a spot beam position measurement method using the same in accordance with exemplary embodiments of the present disclosure can quickly acquire central position coordinates of plurality of BMSs and measure positions of spot beams projected from plurality of optical systems using the central position coordinates of the plurality of BMSs, thereby shortening the time for generating mask data, executing maskless exposures, and being applied to other aspects of substrate processing/manufacturing/testing.

Although exemplary embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A method of measuring spot beam positions of an optical maskless exposure system, the method comprising:
   measuring positions of a plurality of fiducial marks (FMs) engraved on a fiducial beam measurement system (BMS) mark array (FBA) installed on a movable table using spot beams irradiated from a plurality of optical systems and a plurality of BMSs installed on the movable table;
   calculating central position coordinates of the BMSs using position information of the FMs of the FBA and displacements of the FMs measured by the respective BMSs;
   acquiring image information of spot beams irradiated from the optical systems using the BMSs; and measuring positions of the spot beams using a position of the movable table, positions of the plurality of BMSs and the image information acquired by the BMSs.

2. The method of measuring spot beam positions according to claim 1, wherein the BMSs are installed at a lower end of the FBA.

3. The method of measuring spot beam positions according to claim 1, wherein the BMSs have 2 degrees of freedom (X, Y) to be movable in an X-axis direction and a Y-axis direction.

4. The method of measuring spot beam positions according to claim 3, further comprising aligning the BMSs centers with the centers of random FMs by adjustments in the X-axis direction and Y-axis direction.

5. The method of measuring spot beam positions according to claim 3, wherein a number of the BMSs is equal to a number of the optical systems.

6. The method of measuring spot beam positions according to claim 1, further comprising calculating central position coordinates of the BMSs by calculating displacements of the FMs from the central position coordinates of the BMSs through the position information of the FMs of the FBA and the image information acquired by the respective BMSs.

7. The method of measuring spot beam positions according to claim 6, further comprising measuring position coordinates of the spot beams irradiated from the optical systems through position coordinates of the movable table, the central position coordinates of the BMSs and the image information acquired by the respective BMSs.

8. The method of measuring spot beam positions according to claim 7, further comprising forming a pattern on a substrate mounted on the movable table by generating mask data from the measured position information of the spot beams.

9. The method of measuring spot beam positions according to claim 8, wherein forming the pattern on the substrate comprises patterning the mask data on the substrate by acquiring two or more spot beam position coordinates.

10. A maskless exposure apparatus comprising:
a movable table configured to displace a substrate;
one or more optical systems configured to project spot beams to form a pattern on the substrate;
a fiducial beam measurement system (BMS) mark array (FBA) on which a plurality of fiducial marks (FMs) are engraved and which is installed on the movable table;
one or more beam measurement systems (BMSs) configured to measure the plurality of FMs engraved on the FBA using spot beams irradiated from the one or more optical systems; and
a control unit configured to calculate positions of the BMSs using position information of the FMs of the FBA and displacements of the FMs measured by the respective BMSs, to acquire image information of the spot beams using the BMSs, and to measure positions of the spot beams using the positions of the plurality of BMSs and the image information acquired by the BMSs.

11. The maskless exposure apparatus according to claim 10, wherein the BMSs are 2-dimensional imaging devices configured to measure position coordinates of the plurality of FMs and the spot beams.

12. The maskless exposure apparatus according to claim 11, wherein the plurality of FMs are used to acquire central coordinates of the BMSs.

13. The maskless exposure apparatus according to claim 11, wherein the number of BMSs is equal to the number of optical systems.

14. The maskless exposure apparatus according to claim 10, wherein the FBA comprises an array of FMs arranged at a predetermined interval.

15. The maskless exposure apparatus according to claim 10, wherein the control unit is configured to calculate the central position coordinates of the BMSs using the position information of the FMs of the FBA and the displacements of the BMs measured by the BMSs.

16. The maskless exposure apparatus according to claim 15, wherein the control unit is configured to acquire position coordinates of the spot beams irradiated from the optical systems from position coordinates of the movable table, the central position coordinates of the BMSs, and the image information acquired by the respective BMSs.

17. The maskless exposure apparatus according to claim 16, wherein the control unit is configured to form the pattern on the substrate using the mask data by acquiring two or more position coordinates of the spot beams.

18. A method of measuring spot beam positions of an optical maskless exposure system, the system including a plurality of beam measurement systems (BMSs) installed on a movable table and a fiducial BMS mark array (FBA) on which a plurality of fiducial marks (FMs) are engraved and which is installed on the movable table, the method comprising:
adjusting positions of the plurality of BMSs to align centers of the plurality of BMSs with centers of the plurality of FMs to determine an installation error angle and a assembly error angle of the FBA;
calculating central position coordinates of the BMSs due to the installation errors of the respective BMSs and the assembly error of the FBA using position information of the FMs of the FBA and displacements of the FMs measured by the respective BMSs;
using the plurality of BMSs to acquire positions of a plurality of spot beams relative to the BMSs, said spot beans irradiated from a plurality of optical systems onto a substrate disposed on said movable table; and
determining positions of the spot beams relative to a fixed stage underlying the movable table using a position of the moving table, positions of the plurality of BMSs and the position of each beam relative to the BMSs.

19. The method of claim 18, wherein the central position coordinates of the BMSs are calculated from $$^{M}q_k = R(\alpha) \cdot (^{F}p_k - ^{F}p_F) - R(\beta_k) \cdot ^{BMSk}d_k,$$

wherein $^{M}q_k$ are central position coordinates of the respective BMSs with respect to the movable table,
$^{F}p_k$ is an position vector of the $k^{th}$ BMS on the movable table relative to an FM with respect to the FBA,
$^{F}p_F$ is the position vector of a random FM on the movable table with respect to the FBA,
$\alpha$ is the assembly error angle of the FBA mounted on the movable table with respect to the stage,
$\beta_k$ is the installation error angle of the $k^{th}$ BMS with respect to the stage,
R is a rotation matrix, and
$^{BMSK}d_k$ is a displacement of the FM on the FBA from the center of the $k^{th}$ BMS as measured by the $k^{th}$ BMS.

20. The method of claim 19, wherein the positions of the spot beams with respect to the stage are calculated from $$^{S}r_i = ^{S}r_M + R(\alpha) \cdot (^{F}p_k - ^{F}p_F) - R(\beta_k) \cdot ^{BMSk}d_k + R(\beta_k) \cdot ^{BMSk}d_i,$$

wherein $^{S}r_i$ is a position of the $i^{th}$ spot beam measured by a BMS with respect to the stage,
$^{S}r_M$ is a position of the movable table acquired through a feedback signal from the stage,
$R(\alpha) \cdot (^{F}p_k - ^{F}p_F) - R(\beta_k) \cdot ^{BMSk}d_k$ is the central position coordinates of the $k^{th}$ BMS with respect to the movable table, and $R(\beta_k) \cdot {}^{BMSk}d_i$ is a displacement ${}^{BMSk}d_i$ of the $i^{th}$ spot beam from the $k^{th}$ respective BMS as corrected for the installation error angle $\beta_k$ of the $k^{th}$ BMS.

\* \* \* \* \*